Patented Feb. 6, 1951

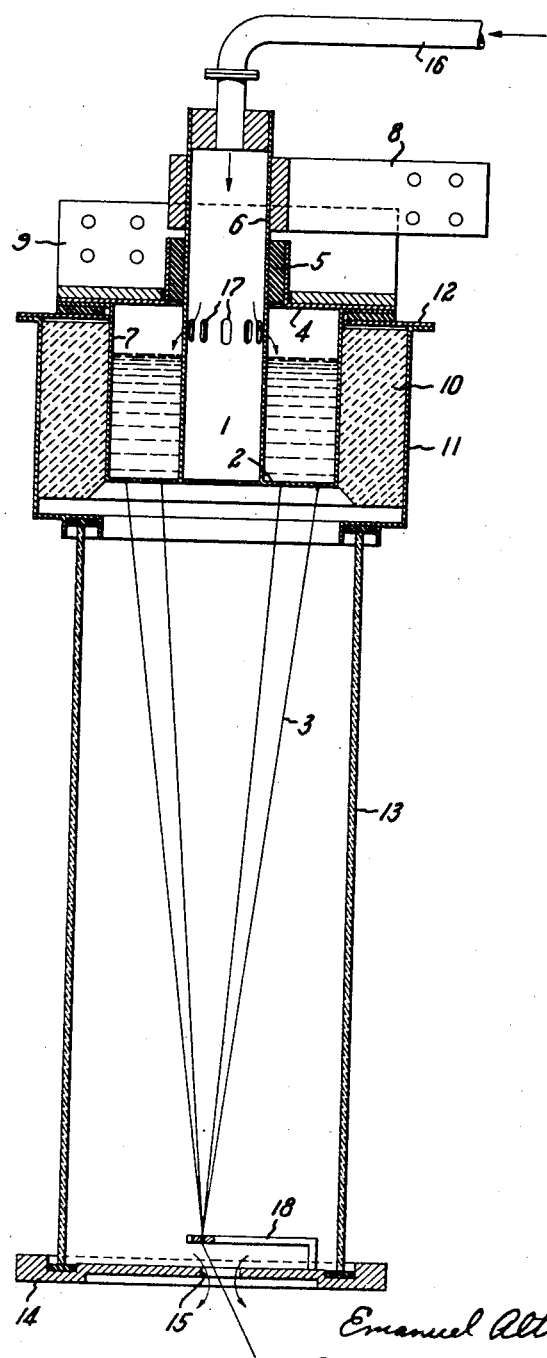

2,540,415

UNITED STATES PATENT OFFICE 2,540,415

ELECTRIC GLASS FILAMENT FURNACE

Emanuel Altman, Prague, Czechoslovakia

Application May 9, 1949, Serial No. 92,138
In Great Britain May 11, 1948

2 Claims. (Cl. 13—6)

The present invention relates to glass furnaces and especially to melting tanks for use in manufacturing continuous glass filament.

It is well known that for continuous glass filament production platinum tanks for melting the glass fragments are used.

At the bottom of these tanks are one or more rows of nozzles through which the glass filament passes.

For the construction of such tanks platinum has been deemed to be absolutely essential so that the molten glass may remain clear of any other contaminating materials, for example metallic or ceramic. Any quantity of these in the molten glass results in obstruction of the nozzles and thereby breaking of the filament which, in turn, not only decreases the output of the production unit but naturally the output of the whole production line.

It has not heretofore been found possible to use in replacement of the highly valued platinum the high fireproof stainless steels, because after a relatively short working period oxidation appears upon the tank walls which are exposed to the air. As a consequence pieces of such oxidized material fall into the molten glass. After a long working period a further oxidization takes place on the tank walls which are exposed to the molten glass. That together with oxidization of the inside of the nozzles greatly shortens the life of the furnace.

Consideration of the use of two or three component platinum alloys is not advisable from an economic point of view on account of the high price of such alloys.

This method of production of continuous glass filaments at present in use has therefore resulted in large investment costs and more especially if it is necessary to maintain a stock of platinum tanks to enable quick change after they have been used.

The object of the present invention is to provide a furnace including a melting tank for manufacturing of continuous glass filament which is not constructed from platinum but from any metallic material which is able to bear high working temperatures without melting.

In the present invention the glass melting tank does not work in the air but in an atmosphere of neutral gas for example $N_2$.

In the present invention also the construction of the furnace is such that the melting tank with spinning nozzles in the bottom, which is manufactured of any high temperature resistant metal, is surrounded with a metal casing which is provided with a tubular extension extending below the bottom of the tank and enclosing the path of the glass filaments extending from the spinning nozzles. The tubular extension is preferably made of transparent heat resistant glass and is provided with a bottom closure having a central aperture through which the produced filaments pass outside of the casing for instance to a winding drum. The space of the casing and of the tube is filled with a neutral gas.

Referring now to the drawing wherein like numerals are employed to designate like parts wherever they occur, the single figure is a semi-diagrammatic vertical sectional view of a furnace embodying the invention.

In the drawing 1 represents a metallic tank the cross-section of which is shaped as an annular ring with spinning nozzles or apertures 2 in its bottom, through which the molten glass passes in the form of filaments 3. The tank 1 is covered with a cap 4 provided with a packing 5 through which passes an internal tubular part 6 of the melting tank 1. The metallic tank 1 is connected as a resistance heating element in an electric current circuit, one pole 8 of which is connected with the internal tubular part 6 of the tank 1, the second pole 9 being connected with a flange of an external part 7 of the tank 1.

The tank 1 is surrounded with a heat resistant insulation 10 and the whole unit, including the tank 1 and the insulation 10 are placed in a metallic casing 11 which is provided with a gas pressure resistant cover 12. To the lower end of the casing 11 is connected a continuation of the casing 11 of cylindrical form 13 surrounding the path of the cone of the filaments produced. The tubular part 13 of the casing 11 is made of heat resistant material and preferably of a heat resistant glass. The lower end of the tubular part 13 of the casing 11 is provided with a bottom 14 in the middle of which is provided an opening 15 through which the produced filaments pass to the winding drum (not shown). The internal space of the casing 11 within its tubular part 13 and within the internal space of the melting tank 1 over the glass level is filled with a neutral gas which is passed into the internal space through a piping 16 communicating with the internal tubular part 6 of the melting tank 1.

The said part 6 is provided with apertures 17 enabling passing of the gas into the space over the glass level. Close to the bottom 14 are arranged means for forming the produced filaments into a bundle which passes out through the opening 15 into the normal atmosphere, for example to the winding drum.

Having now particularly described and ascertained the nature of my said invention and in what manner the same is to be performed, I declare that what I claim is:

1. Apparatus for the manufacture of glass filaments from molten glass comprising a metallic tank adapted to contain molten glass and having a bottom wall, a central tubular electrode rising from the bottom wall to above the top of the tank, said tubular electrode having apertures in the wall thereof communicating with the upper portion of the tank above the level of the molten glass therein, the bottom wall of said tank having apertures therein communicating with the interior of said tubular electrode and having a plurality of spinning orifices surrounding said electrode, a gas tight casing enclosing said tank including a tubular portion extending below the bottom of the tank and enclosing the path of the filaments extending from said spinning orifices, said tubular portion of said casing having a bottom wall provided with an aperture for the passage therethrough of the glass filaments, and means for supplying an inert gas to the upper end of said tubular electrode for flow through the apertures therein to the space above the molten glass in the tank and through the apertures in the bottom of the tank to the space enclosed by said tubular portion of the casing.

2. Apparatus as defined in claim 1 in which the tubular portion of the casing extending below the bottom of the tank is formed of transparent heat resistant glass.

EMANUEL ALTMAN.

REFERENCES CITED

The following references are of record in the file of this patent:

UNITED STATES PATENTS

| Number | Name | Date |
|---|---|---|
| 614,927 | Burton | Nov. 29, 1898 |
| 1,427,014 | Von Pazsiczky | Aug. 22, 1922 |
| 2,159,361 | Atkinson et al. | May 23, 1939 |
| 2,212,528 | Slayter | Aug. 27, 1940 |
| 2,225,667 | Staelin | Dec. 24, 1940 |
| 2,229,489 | Barnard | Jan. 21, 1941 |
| 2,244,267 | Slayter et al. | June 3, 1941 |

FOREIGN PATENTS

| Number | Country | Date |
|---|---|---|
| 512,700 | Great Britain | Sept. 22, 1939 |